United States Patent Office 2,861,414
Patented Nov. 25, 1958

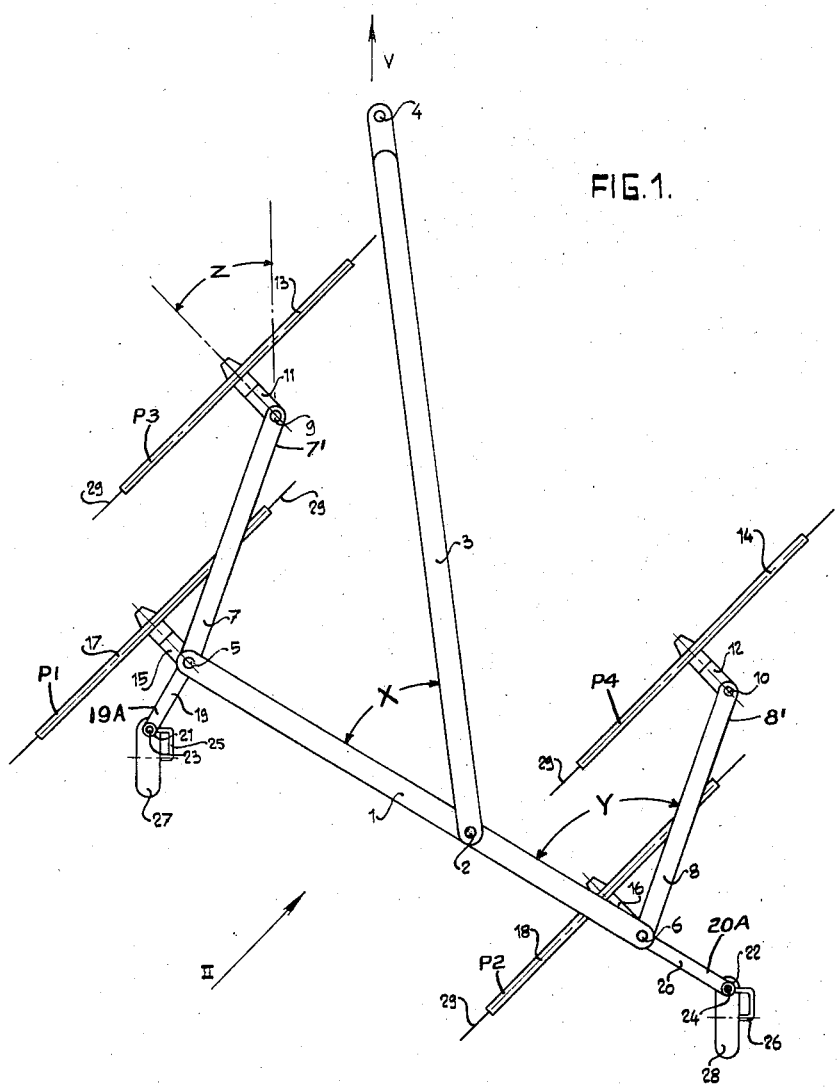

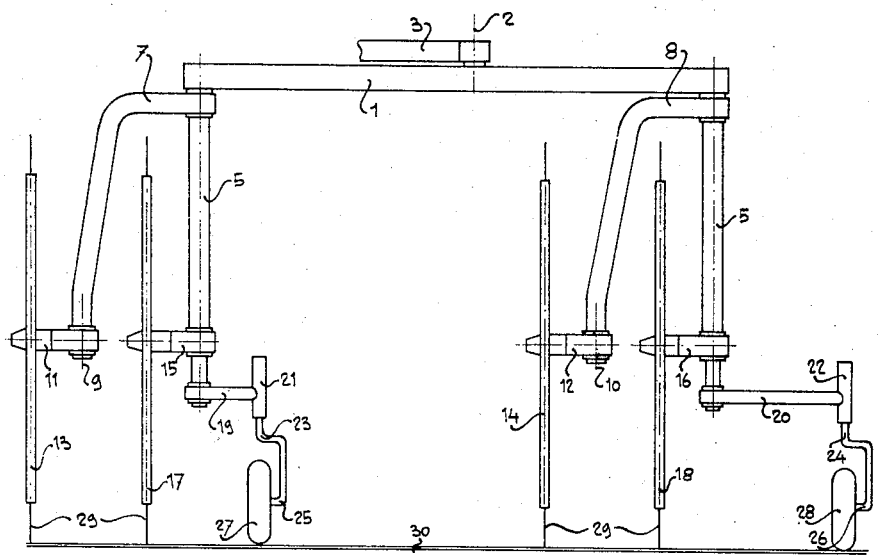

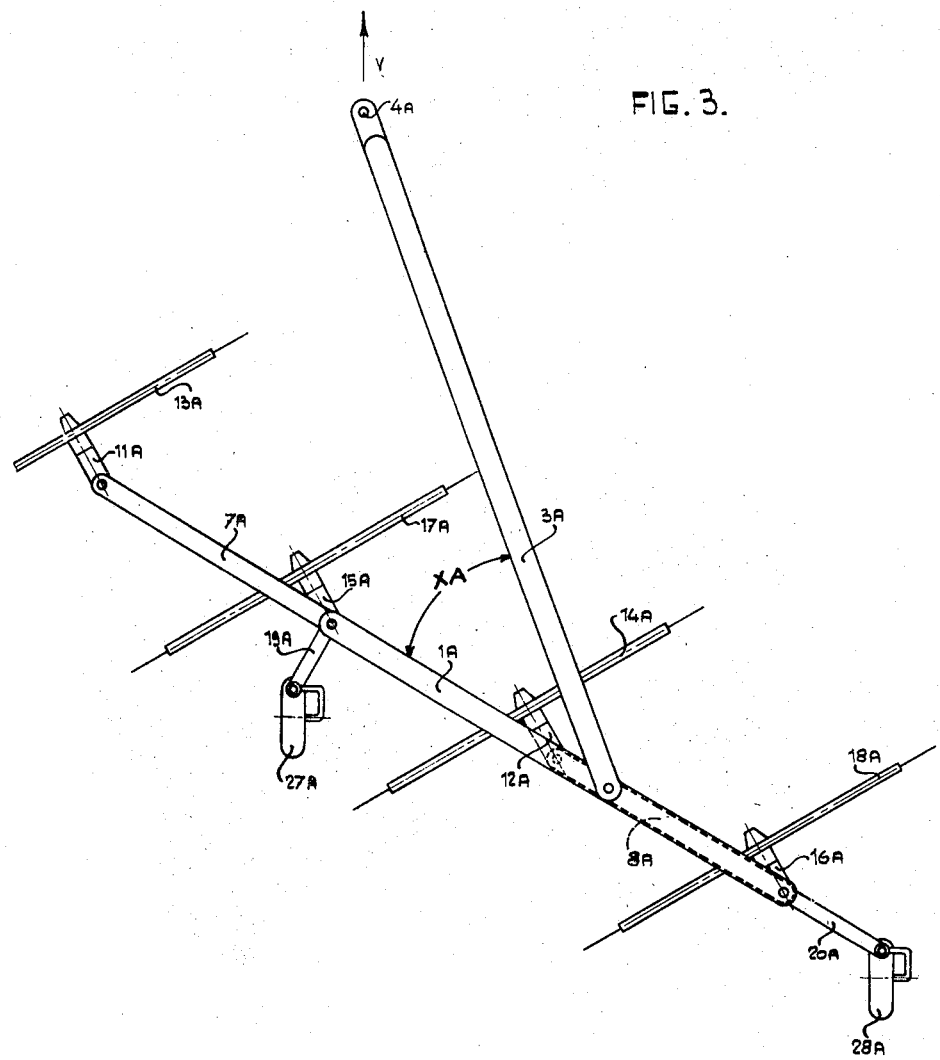

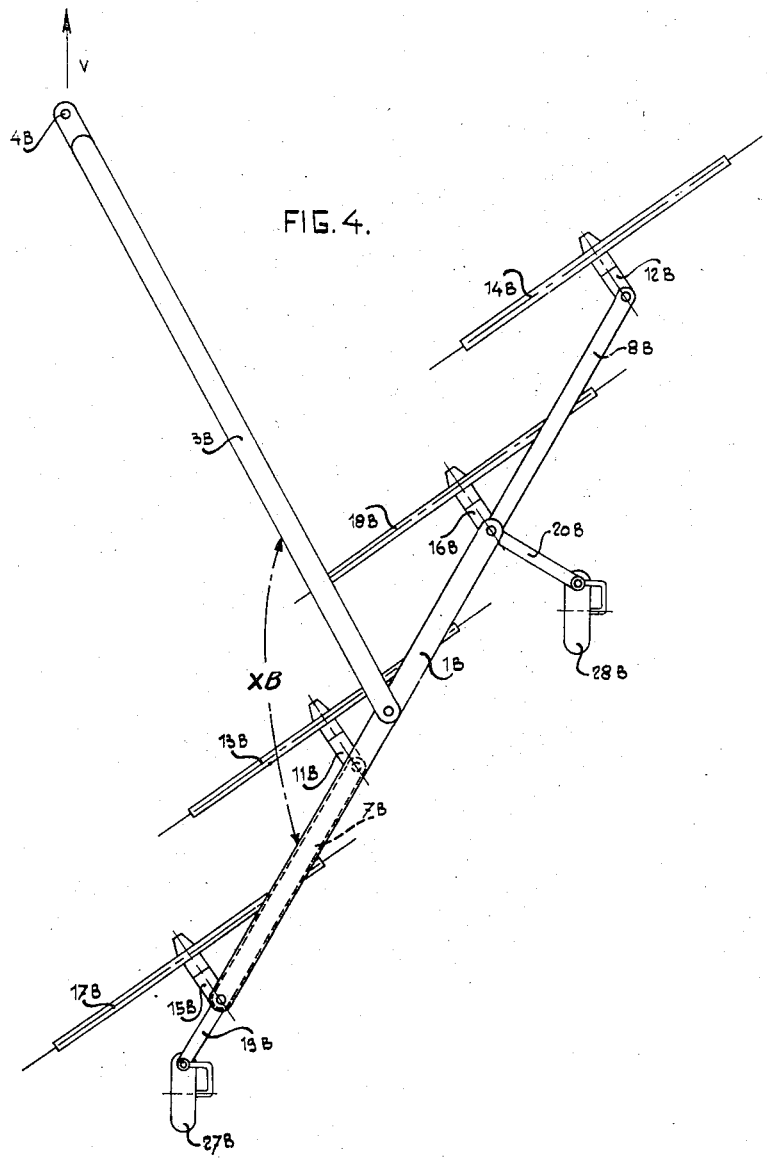

2,861,414

DEVICE FOR LATERALLY DISPLACING MATERIAL LYING ON THE GROUND

Cornelis van der Lely and Ary van der Lely, Maasland, Netherlands, assignors to C. van der Lely N. V., Maasland, Netherlands, a limited liability company of the Netherlands Application September 21, 1955, Serial No. 535,695

Claims priority, application Netherlands September 23, 1954

8 Claims. (Cl. 56—377)

This invention relates to devices for laterally displacing material lying on the ground by means of rotatable members.

The invention is particularly concerned with providing a device suitable for turning two or more swaths which are each worked by a group of at least two raking members, the foremost raking member of each group supplying material to the hindmost raking member of the group.

Swath turners performing in the above indicated manner are known and can be used for turning normal swaths as deposited by a mower. In many cases, however, it is desirable to turn crop which is scattered on a field and to deposit the same as narrow swaths. Known devices having groups of two or more rake wheels are generally not too suitable for performing the aforenoted functions.

It is accordingly an object of the invention to provide an improved device which can be used to turn crop lying scattered on a field and to deposit it in narrow swaths.

According to an embodiment of the invention achieving the aforenoted objective, at least one group of raking members includes a shaft for raking member which shaft is rotatable about a substantially vertical axle the center line of which can be displaced about a second substantially vertical axle spaced from the first axle. The arrangement is such that a raking member can be positioned so that it and another raking member of the same group work the material lying upon adjacent strips of land separately. When each group of rake wheels comprises, for example, two rake wheels, the arrangement of the rake wheels in the modified position of the device will be such that the crop is arranged in narrow swaths.

Further details will be hereinafter more fully described with reference to the accompanying drawings in which a preferred embodiment of the invention is illustrated by way of example and in which:

Fig. 1 is a plan view of a device according to the invention and in a position in which it is suitable for turning normal swaths, Fig. 2 is a side elevational view of the same device, viewed from the direction of the arrow II in Fig. 1, Fig. 3 is a plan view of the device according to Figs. 1 and 2 in a modified position in which the device is suitable for turning narrow swaths, Fig. 4 shows a plan view of the same device in a third position in which position the device can be used as a side delivery rake.

According to Figs. 1 and 2 the device consists of a frame girder 1 to which a drawing member 3 is connected which is rotatable about a vertical axle 2. The device is moved forward over the field in the direction of the arrow V by means of a tractor (not shown) connected to the foremost extremity 4 of the drawing member 3. The angle X between the horizontal frame girder 1 and the drawing member 3 can be adjusted in a manner indicated by Patent No. 1,974,410 (Caughey).

When the device is used for turning normal swaths the drawing member is secured with regard to the frame girder 1 in the position shown in Fig. 1. Shafts or axles 5 and 6 directed vertically downwards are connected to the extremities of the frame girder 1 said shafts 5 and 6 together with said girder constituting the frame of the device. Near the girder 1, an extremity of each of arms 7 and 8, respectively, is rotatably connected to a shaft 5 or 6 and is adjustable in a manner known per se from Patent No. 2,293,559 which shows how to pivotally relate two members. In the illustrated case arms 7 and 8 are secured against displacement in parallel positions, the angle Y between the girder 1 and the horizontal part of the arm 8 being somewhat smaller than a right angle.

The extremities 7' and 8' of the arms 7 and 8 are spaced from the shafts 5 and 6, respectively, and support axles 9 and 10, respectively, for horizontal shafts 11 and 12 upon each of which a raking member 13 or 14 is rotatably mounted. The shafts 11 and 12 are secured in parallel positions on the arms 7 and 8, said positions being such that the planes of the rake wheels make an angle Z of about 45° with the travelling direction of the device. At the same level as shafts 11 and 12, horizontal shafts 15 and 16 are rotatably fastened to shafts 5 and 6, respectively. Raking members 17 and 18 are mounted on shafts 15 and 16, respectively. In principle shafts 15 and 16 are rotatable about shafts 5 and 6, respectively, but as illustrated in Fig. 1 shafts 15 and 16 can be secured (see Patent No. 2,261,074) parallel to the shafts 11 and 12. Thus, the planes P1 and P2 of raking members 17 and 18 are parallel to the planes P3 and P4, of raking members 13 and 14.

Arms 19 and 20 which are rotatable in a horizontal plane are connected to the lower extremities of the shafts 5 and 6, respectively. In the illustrated case, the arm 19 is secured in a position which seen from above makes a right angle with the frame girder 1. The arm 20 is secured to the shaft in such a position that this arm is parallel to the frame girder 1. In a manner known per se from Patent No. 2,293,559, the shafts 11, 12, 15 and 16 and the arms 19 and 20 can be adjusted as to relative position.

Arms 19 and 20 respectively carry at their extremities 19a and 20a vertical tubes 21 and 22 which constitute bearings for vertical shafts 23 and 24. The shafts 23 and 24 form integral parts of horizontal axles 25 and 26 for running wheels 27 and 28, respectively. The horizontal axles 25 and 26 are spaced from the vertical axles 23 and 24 so that, in principle, the wheels 27 and 28 are self-adjusting wheels. In Figs. 1 and 2, however, the shaft 24 is secured so that the running wheel 28 maintains the position shown in Fig. 1. Each of the shafts 23 and 24 can, if desired, be clamped in position in a manner known per se from U. S. Patent No. 2,680,343. Moreover, positionable running wheels have long been commercially known as shown, for example, in the Bassick Truck Casters Price List No. TC–23 of July 15, 1948, p. 16. The shaft 23 is, however, freely rotatable in the working position of the device shown in Fig. 1.

When the illustrated device is moved over the field in the direction of the arrow V, the raking members 13 and 17 will jointly work the material lying upon a strip of land, while the raking members 14 and 18 will work the material lying upon an adjacent strip of land. All normal swaths can be turned with this device. The raking members 13 and 17 and 14 and 18, respectively, constitute groups of raking members in which the foremost raking member supplies the material lying on the land to the hindmost raking member.

Fig. 3 shows a modified position of the parts of the device whereby it is achieved that the raking members do not co-operate in groups. In their modified positions, the parts of the device which are also found in Figs. 1 and 2 are provided with similar reference numerals to which, however, an A is added for the sake of distinction.

It can be seen that draw arm 3A makes an angle XA with the frame girder 1A which angle is smaller than 45°. The arms 7A and 8A extend in the same direction and are secured in parallel with the girder 1A. The shafts 11A, 12A, 15A and 16A are secured in mutually parallel positions which positions are such that the planes of the raking wheels 13A, 14A, 17A and 18A make an angle of about 60° with the travelling direction V. The arms 19A and 20A are still located in the same position with regard to the frame girder 1A as in Fig. 1. The running wheel 27A is self-adjusting, while the running wheel 28A is secured in the same position with regard to the arm 20A as in Fig. 1.

The raking members 13A, 17A, 14A and 18A work four adjacent strips of land with the effect that every raking member delivers the material lying upon the processed strip to the left. In this case, however, the material delivered by a raking member is never supplied to another raking member, so that the raking members work the four strips separately. The crop lying upon each of the four strips is turned by means of the device and deposited in small swaths.

According to Fig. 4, the device described can also be arranged in a third position in which the device works as a side delivery rake. In Fig. 4, the parts of the device are denoted with the same numerals, said numerals being provided, however, with a B for the sake of distinction. The angle XA between the arm 3B and the frame girder 1B amounting to about 40° in Figs. 1 and 3, is now on angle XB of about 120°. Compared to the positions of the arm 19A and the arm 20A in Fig. 3, the arms 19B and 20B are arranged at a right angle with regard to the frame girder 1B. Now the running wheel 28B is self-adjusting and the running wheel 27B is secured in a vertical plane parallel to the travelling direction V. The arms 7B and 8B are placed opposite to the position of said arms in Fig. 3 and are secured in these positions. The horizontal shafts 12B, 16B, 11B and 15B are secured in mutually parallel positions, said positions being such that the planes of the raking members 14B, 18B, 12B and 17B with regard to the travelling direction V have the position shown in Fig. 4.

The material delivered to the left by means of the raking member 14B is transported further to the left by means of raking member 18B, the material delivered by means of the raking member 18B is delivered still further to the left by means of the raking members 13B and 17B in a similar manner. Consequently, the four raking members work cojointly a single broad strip of land, all of the material present upon this strip being deposited in a swath adjacent the strip.

It will be evident that the securing devices for the various elements which are rotatable about vertical shafts with regard to one another are preferably such that the members can be secured in all sorts of different positions relative to one another. By this construction, the working width of the device can be changed in the three different cases and the most favorable position of the elements can be chosen for any material and any position of the swaths.

It is noted that the frame girder 1 must be located above the highest points of the raking members. Preferably, the hinging connections by means of which the shafts of at least some of the raking members are rotatable about substantially vertical axes are also arranged above the raking members.

It will be understood that the described device in which the shafts of the raking members can rigidly be connected to the frame of the device not only has the advantage that resilient elements between said shafts and the frame are superfluous, but also that the frame girder 1 and associated parts can have a lower position by which the entire device is compact with a reduced weight.

What we claim is:

1. An implement for displacing material lying on the ground comprising a mobile frame, substantially vertical axles supported by said frame in spaced relation, arms supported on said vertical axles and extending laterally therefrom in determinable positions relative thereto, rotatable raking members supported on said arms in mutually spaced relationship and in determinable relationship with said frame for displacing material lying on the ground, a draw arm operatively associated with said frame for imparting ground traversing movement thereto, and running wheels operatively associated with said frame for the ground traversing movement.

2. An implement as claimed in claim 1 wherein said arms are pivotal on said axles to positions for supporting the raking members in spaced groups relative to said frame for treating separate strips of material.

3. An implement as claimed in claim 1 wherein said arms are pivotal on said axles to positions for supporting the raking members in overlapping relationship with the rearmost portions of the raking members in trailing relationship to the foremost portions of the adjacent raking members whereby the device operates as a swath turner.

4. An implement as claimed in claim 1 wherein said arms are pivotal on said axles to positions for supporting the raking members in overlapping relationship with the foremost portions of the raking members in trailing relationship to the rearmost portions of the adjacent raking members whereby the implement operates as a side delivery rake.

5. An implement as claimed in claim 1 comprising means for locking one of said running wheels in fixed position relative to said frame.

6. An implement as claimed in claim 1 comprising means for locking said draw arm in fixed position relative to said frame.

7. An implement as claimed in claim 1 wherein said frame and said arms include portions sufficiently elevated so as to extend over said raking members.

8. An implement as claimed in claim 1 wherein the raking members on each arm define parallel planes.

References Cited in the file of this patent

FOREIGN PATENTS

| | | |
|---|---|---|
| 680,537 | Great Britain | Oct. 8, 1952 |
| 518,628 | Belgium | Apr. 15, 1953 |
| 1,076,339 | France | Apr. 12, 1954 |
| 1,080,088 | France | May 26, 1954 |